(12) United States Patent
Anderton et al.

(10) Patent No.: US 7,271,899 B2
(45) Date of Patent: Sep. 18, 2007

(54) MILLIMETRE-WAVE DETECTION DEVICE FOR DISCRIMINATING BETWEEN DIFFERENT MATERIALS

(75) Inventors: Rupert Nicholas Anderton, Malvern (GB); Paul Antony Manning, Malvern (GB); Kevin James Palmer, Malvern (GB)

(73) Assignee: QinetiQ Limited (GB)

( * ) Notice: Subject to any disclaimer, the term of this patent is extended or adjusted under 35 U.S.C. 154(b) by 112 days.

(21) Appl. No.: 10/524,596

(22) PCT Filed: Aug. 21, 2003

(86) PCT No.: PCT/GB03/03661

§ 371 (c)(1),
(2), (4) Date: Feb. 15, 2005

(87) PCT Pub. No.: WO2004/038453

PCT Pub. Date: May 6, 2004

(65) Prior Publication Data

US 2005/0274890 A1    Dec. 15, 2005

(30) Foreign Application Priority Data

Sep. 3, 2002    (GB) ................................. 0220434.5

(51) Int. Cl.
*G01J 4/00* (2006.01)
(52) U.S. Cl. ...................................... 356/364; 343/754
(58) Field of Classification Search ................ 356/369, 356/364; 250/201.2–201.4; 343/753, 754, 343/756, 772
See application file for complete search history.

(56) References Cited

U.S. PATENT DOCUMENTS 3,558,214 A * 1/1971 Gijsbertus et al. .......... 359/250

(Continued)

FOREIGN PATENT DOCUMENTS

EP          0 809 123        11/1997

(Continued)

OTHER PUBLICATIONS

McLeod, John H., "The Axicon: A New Type of Optical Element." Journal of the Optical Society of America, vol. 44, No. 8, Aug. 1954, pp. 592-597.*

(Continued)

*Primary Examiner*—Gregory J. Toatley, Jr.
*Assistant Examiner*—Scott M. Richey
(74) *Attorney, Agent, or Firm*—McDonnell Boehnen Hulbert & Berghoff LLP

(57) ABSTRACT

A detection device that can be used for detecting objects behind clothing etc including a dielectric lens and a receive element sensitive to millimetre wave radiation. Prior art systems produce an image of a scene usually using scanning optics. This can be large and expensive. The present invention instead take spot readings from different parts of a scene without building up an image. The spot readings are processed, and an indication given to a user if certain characteristics of the readings are observed. Typical characteristics used are the differences in absolute received power level, and the power level at different polarisations. Such characteristics are typically present is an object of interest is in the scene. Also disclosed are various methods of altering the received beam to get readings from different areas from the scene, such as changing the beam width, or beam angle.

28 Claims, 12 Drawing Sheets

U.S. PATENT DOCUMENTS

Figure 1:
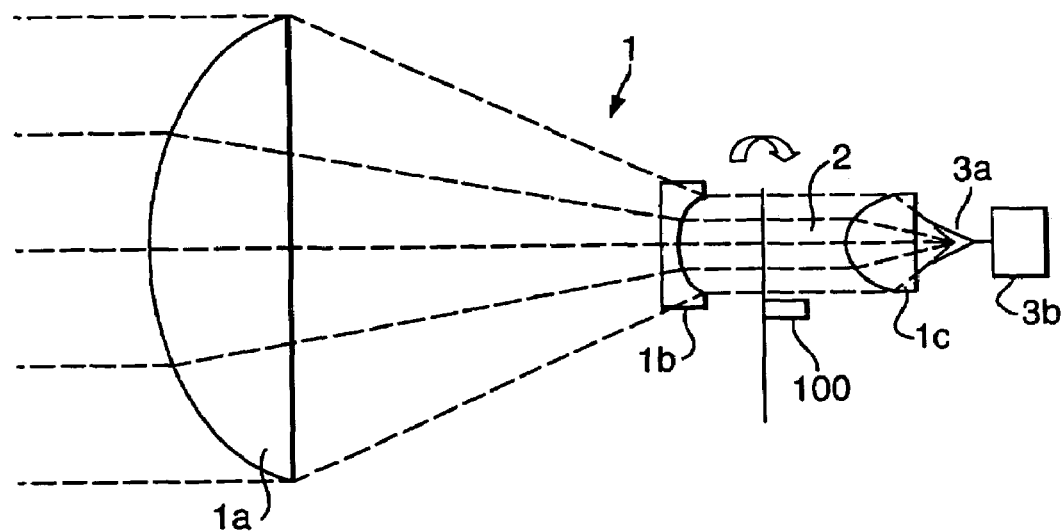

| | | | |
|---|---|---|---|
| 3,754,281 A * | 8/1973 | Kampf | 346/139 B |
| 3,780,293 A * | 12/1973 | Flint | 250/339.03 |
| 3,784,899 A * | 1/1974 | Chalfin | 324/334 |
| 4,586,794 A * | 5/1986 | Bierleutgeb et al. | 359/381 |
| 4,639,094 A * | 1/1987 | Aono | 359/654 |
| 4,903,033 A * | 2/1990 | Tsao et al. | 343/700 MS |
| 5,047,783 A * | 9/1991 | Hugenin | 342/179 |
| 5,073,782 A | 12/1991 | Huguenin | |
| 5,264,859 A | 11/1993 | Lee et al. | |
| 5,942,899 A * | 8/1999 | Shrekenhamer et al. | 324/326 |
| 6,101,015 A * | 8/2000 | Budil et al. | 324/316 |

FOREIGN PATENT DOCUMENTS

| | | |
|---|---|---|
| EP | 1 339 902 | 8/2003 |
| JP | 100148673 | 6/1998 |
| WO | WO98/32035 | 7/1998 |
| WO | WO98/47020 | 10/1998 |
| WO | WO 01/33258 | 5/2001 |
| WO | WO 02/35259 | 5/2002 |

OTHER PUBLICATIONS

International Search Report from the European Patent Office for Application No. PCT/GB03/03661.

* cited by examiner

MILLIMETRE-WAVE DETECTION DEVICE FOR DISCRIMINATING BETWEEN DIFFERENT MATERIALS

This invention relates to a detection device. More specifically, the invention relates to a device for detecting the presence of an object having a particular property, where the background to the object, or the object's surroundings has a differing property. The invention is particularly aimed towards the detection of objects using millimetre wave electromagnetic radiation.

Millimetre wave systems currently exist that are able to create an image of a scene using the radiation coming from the scene, in an analogous fashion to an ordinary camera recording a scene using radiation at visible wavelengths. These systems produce an image of the radiometric temperature of the scene. The frequencies used in such imagers may be between around 10 GHz up to around 400 GHz. Lower frequencies suffer from the problem of having poor resolution, whereas component costs at the higher frequencies make the systems prohibitively expensive. If a small system is required at reasonable cost, the reduced antenna size will exacerbate the problem of poor resolution, leading to much reduced performance. For this reason, millimetre wave imagers tend to be large devices. One such device is described in PCT publication WO 98/47020, this describing a scanning imager that has, as a preferred embodiment, an array of receive elements. Scanning optics direct the incoming millimetre wave radiation from various portions of the target area to these elements, and the detected radiation is processed to produce an image of the scene. The scanning is achieved using a large rotating reflector, the rotational axis of which is inclined to the normal to the face of the disk.

Other millimetre wave imagers exist that use a single receive element and scan radiation from various directions onto this element, to build up an image of the scene over time. These systems generally comprise a dish with a single receiver mounted at the focus. The dish is mounted such that it may be scanned across a scene in a raster, or other suitable pattern. Such systems often take minutes to complete a single scan. Reducing the quantity of receive elements in a system can result in a cheaper system that may be designed and used much more quickly. However, each of the fewer elements will need to be scanned across a wider area of coverage in order to produce an image equivalent to one created with more elements. This will take more time, in which the scene may change.

It is an aim of the present invention to provide a system for the detection of objects that is much simpler than a full imaging system, and portable and quick in operation.

According to the present invention there is provided a detection device for discriminating between different materials comprising an optical system having at least one dielectric lens element and a receive element characterised in that the receive element is sensitive to millimetre-wave radiation, the optical system is arranged to focus incident energy from a scene onto the receive element, and the device is adapted to measure the power of a received signal at different times and further adapted to be able to make measurements from different parts of the scene, and provide an indication based on the measurements.

The present invention provides a device that does not form an image of the scene; it merely takes one or more measurements of the energy, or radiometric temperature, coming from a particular part or parts of the scene according to the beam properties of the antenna. This reading will vary depending upon where the antenna is pointed, and so will give the user an idea as to the radiometric temperature of the region at which the antenna is pointing. The device is particularly suited to be operable at millimetre wave frequencies, where it can be made particularly compact as compared to a mm-wave imaging system, and may be arranged to provide real-time readings.

The device is particularly suitable for taking radiometric measurements of the body of a person to provide an indication as to what he or she may be carrying, as the radiometric properties of most objects carried will in general be different to that of the body.

Preferably the antenna, receive element and indication means are combined into a single, easily portable unit, such that a user can conveniently take measurements from different parts of a body to get an idea as to the variation of the radiometric temperature within the target area.

Preferably the antenna comprises at least one dielectric lens element. More preferably, one embodiment of the antenna comprises a plurality of compound lenses such that a substantially afocal telescope arrangement is formed. Preferably, the radiation emanating from the afocal telescope is focused onto the receive element using a further dielectric lens. Alternatively the antenna may comprise of a mirror or mirrors arranged to focus radiation from the scene onto a receive element.

The invention may also incorporate a calibration element. The calibration element preferably comprises a rotatable disk, the disk being divided into a plurality of regions, one or more being substantially transparent to the received radiation, and one or more being opaque, where the opaque regions may comprise a material absorptive at the radiation frequency of interest.

Preferably, the calibration element is positioned behind the rear element of the afocal telescope, so that it is in the narrow beam of collimated radiation produced by the telescope.

Whilst the invention as so far described is useful for providing discrimination between different parts of a target, it is generally unable to detect radiation having a polarisation orthogonal to the orientation required by the receive element. Another embodiment enhances the ability of the detector to discriminate between radiation polarised in different ways. This embodiment may incorporate polarisation sensitive elements that allow the radiometric temperature of the target to be gauged for differing polarisations and at different parts of the target. Preferably, the device may provide an indication to the user if there is little difference in the received energy at orthogonal polarisations whilst still detecting a difference in energy received at the same polarisation, at different parts of the target or between the target and the absorptive element of the calibration disk. This indication may be activated if the orthogonal polarisation difference is less than a given threshold, whilst the parallel polarisation difference between the target and the absorptive element of the calibration disk or between different parts of the target is greater than a given threshold. A greater ability to detect metal objects is achieved with this scheme. The indication may be aural, visual or tactile, and may comprise an analogue or digital meter, a sound alert, a vibration unit, or may comprise any other suitable indication means.

The polarisation sensitive elements may be arranged to convert the incoming radiation to a single polarisation. This arrangement may comprise of one or more quarter wave plates or Faraday rotators. The arrangement is preferably able to provide a measure of the radiometric temperature of an object at two orthogonal polarisations. A further embodiment includes at least two quarter-wave plates mounted upon a rotating disk such that as the disk rotates each quarter wave plate is in turn positioned in the path of the incoming radiation. These discs may be mounted upon the calibration element if present, such that the plates occupy the substantially transparent portions of the rotatable disk. The plates may be arranged such that at least one pair have their fast axes at 90° to each other. The embodiment also has a fixed quarter-wave plate mounted behind the rotating plates. There may be a linear polariser on top of some or each of the quarter-waves plate to improve the discrimination of each polarisation.

The device may also be arranged to alter the beam pattern without a user physically moving the antenna, such that differing readings of separate, adjacent or overlapping areas of the scene are recorded. The readings from these different areas may then be compared, and an indication provided if the difference in readings exceeds a given threshold. This embodiment effectively calibrates the system by reference to the difference between readings from different areas, and so a calibration element within the device would not be required.

One embodiment that achieves this has means for redirecting the beam pattern of the antenna without physically moving the antenna. Preferably this comprises means for scanning the beam in a conic fashion. This may be done by means of a rotatable prism, which may be mounted behind the afocal telescope in the narrow collimated beam it produces.

A further embodiment incorporates means within the antenna for changing the beamwidth, such that the spot size on the target is also changed. Radiometric temperature readings taken with different size beamwidths may be compared, and an indication provided if differences beyond a given threshold are found.

An alternative embodiment that may be used for altering the beam pattern does not use an afocal telescope, but instead employs a slab of dielectric material rotatably mounted behind a lens, and positioned in the path of incoming radiation focused by the lens. The slab is arranged to have two main faces parallel to each other, with a normal to these faces being at a non-zero angle to the axis of rotation of the slab. A further embodiment may, however, incorporate both an afocal telescope and a slab of rotatably mounted dielectric material.

According to a second aspect of the invention there is provided a method of detecting objects present in a scene by means of receiving millimetre wave radiation from the scene, characterised in that:
   a first measurement is made of radiation from a first part of the scene;
   a further measurement is made of radiation from a second part of the scene;
   an indication is provided if characteristics of the first measurement are different to characteristics of the further measurement.

Figure 2:
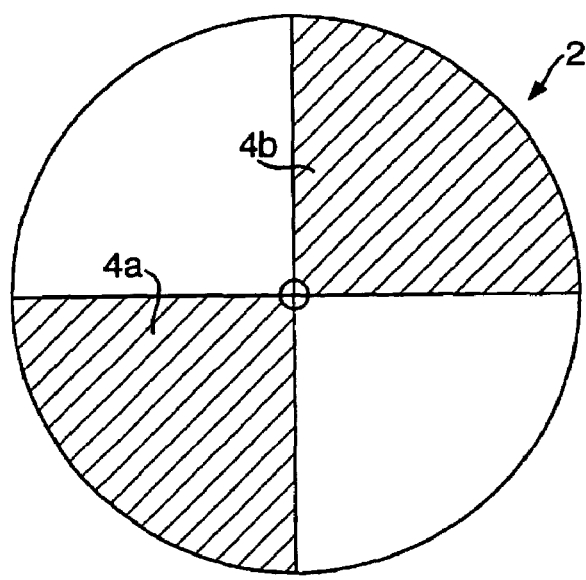
Figure 3:
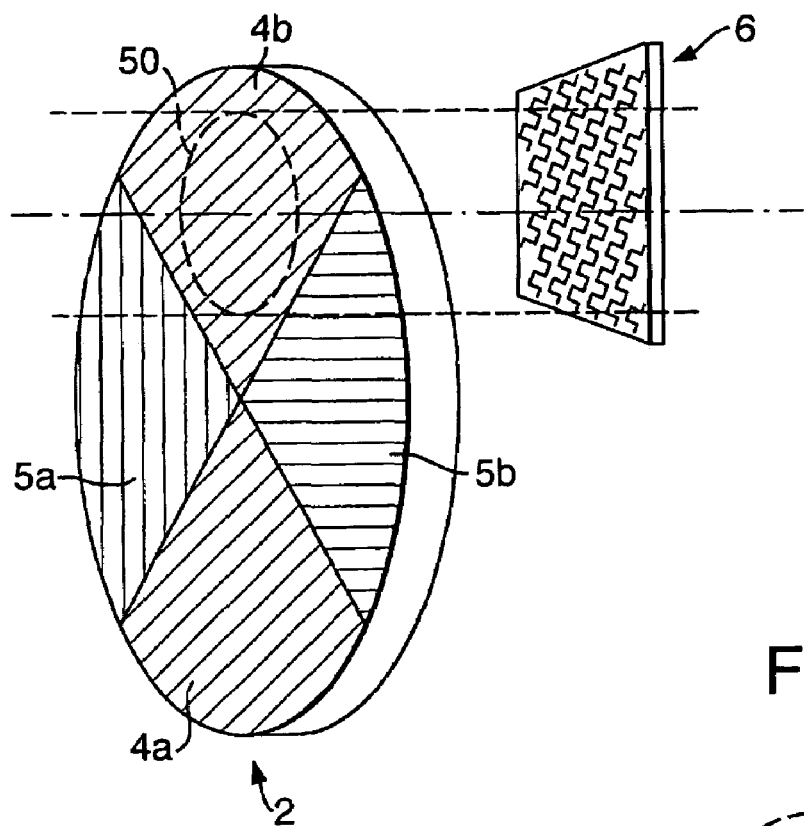
Figure 4:
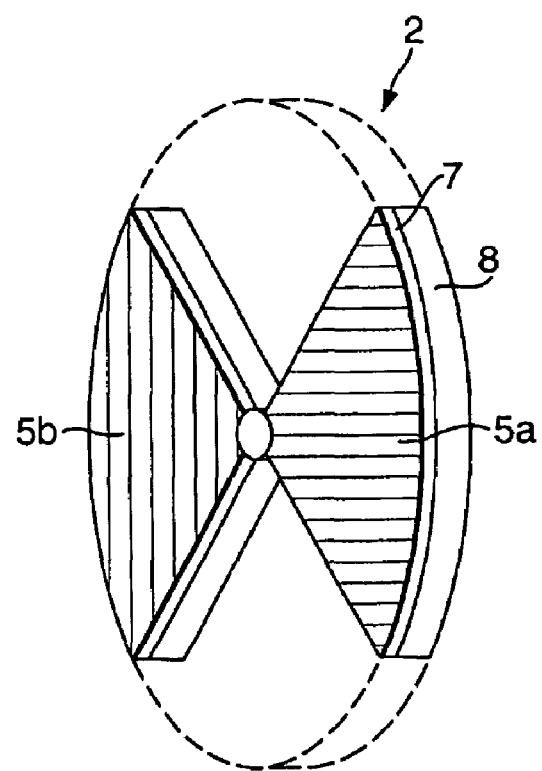
Figure 5:
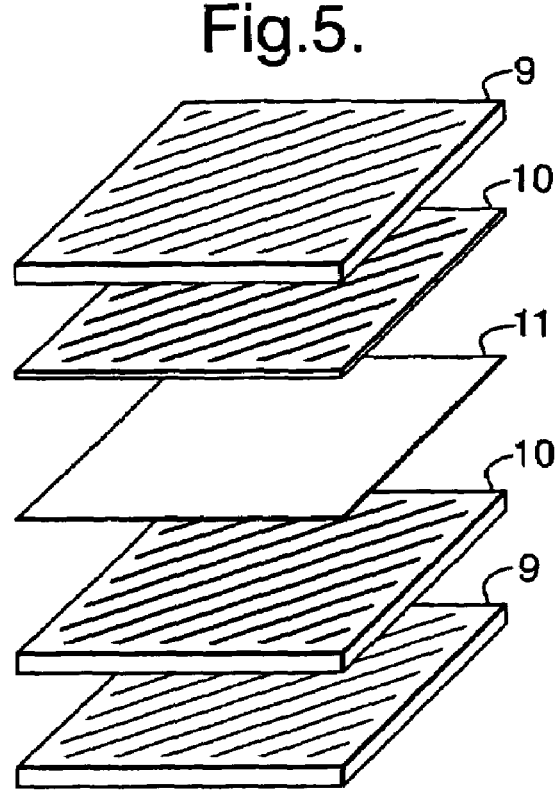
Figure 6:
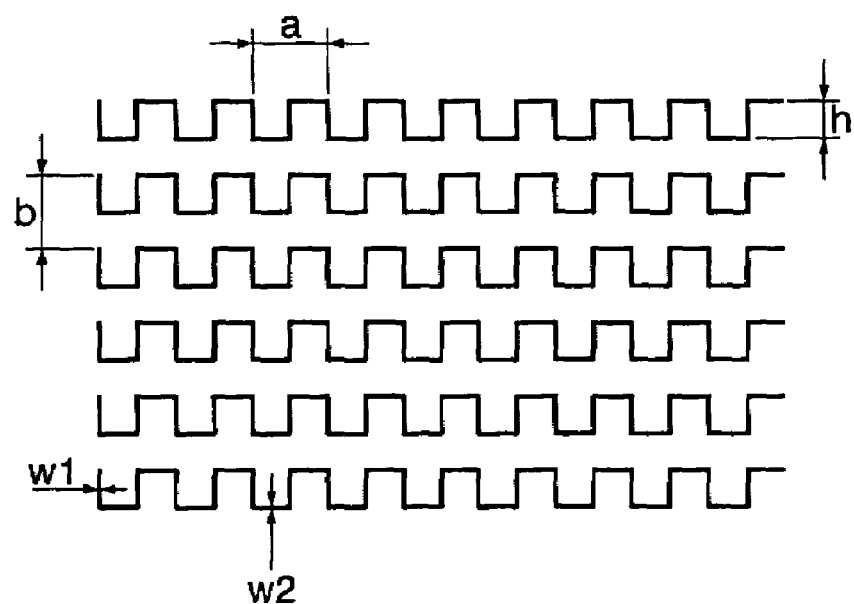
Figure 7:
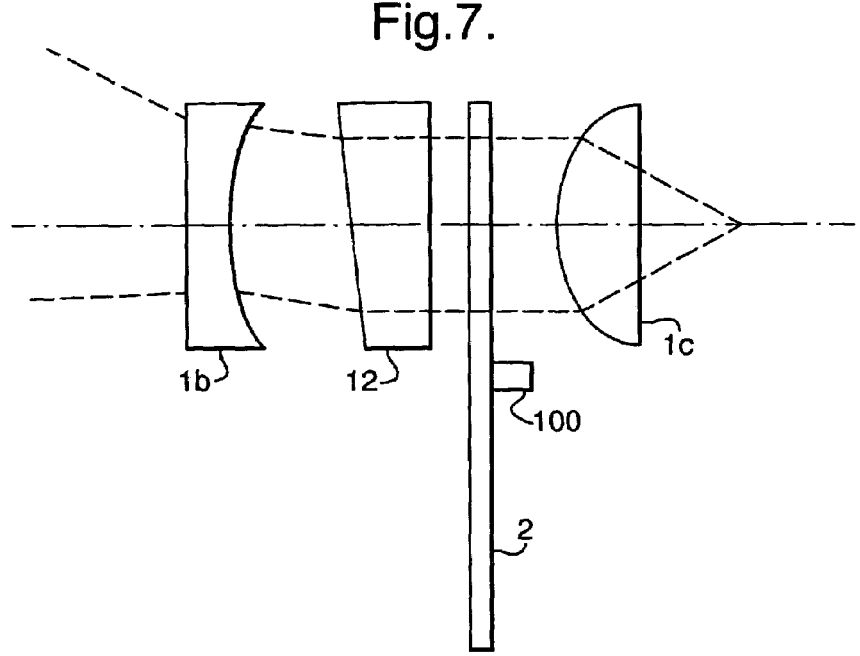
Figure 8:
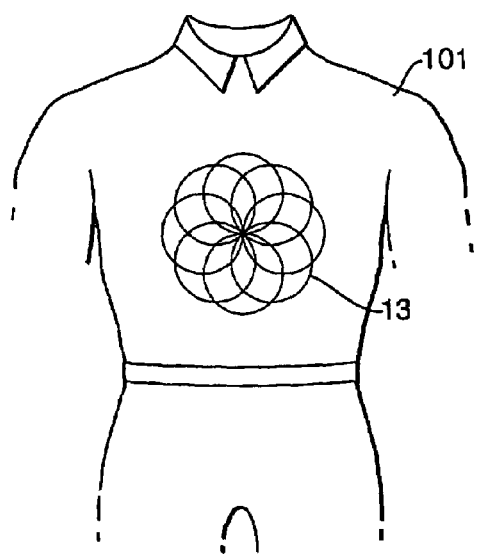
Figure 9:
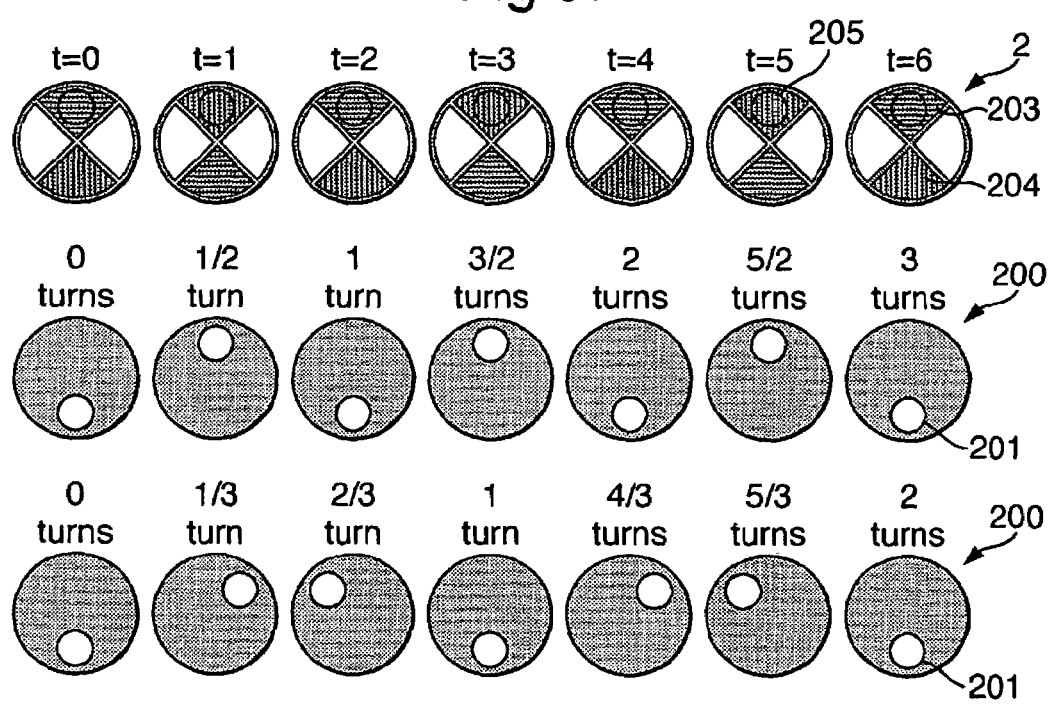

The invention will now be described in more details, by way of example only, with reference to the following figures, in which:

FIG. 1 diagrammatically illustrates a first embodiment of the current invention;

FIG. 2 diagrammatically illustrates the calibration element present in the first embodiment;

FIG. 3 diagrammatically illustrates certain polarisation sensitive elements of a second embodiment of the current invention;

FIG. 4 diagrammatically illustrates more details of a certain polarisation sensitive element of the second embodiment;

FIG. 5 diagrammatically illustrates in more detail the design of a meanderline structure used as a polarisation sensitive element;

FIG. 6 diagrammatically illustrates further design details of a meanderline as incorporated into the second embodiment of the current invention;

FIG. 7 diagrammatically illustrates certain parts of a third embodiment that incorporates means for modulating the receive beam direction;

FIG. 8 diagrammatically illustrates a typical scan pattern resulting from the receive beam modulation upon a scene;

FIG. 9 diagrammatically illustrates the result of changing the scan characteristics of the third embodiment.

Figure 10:
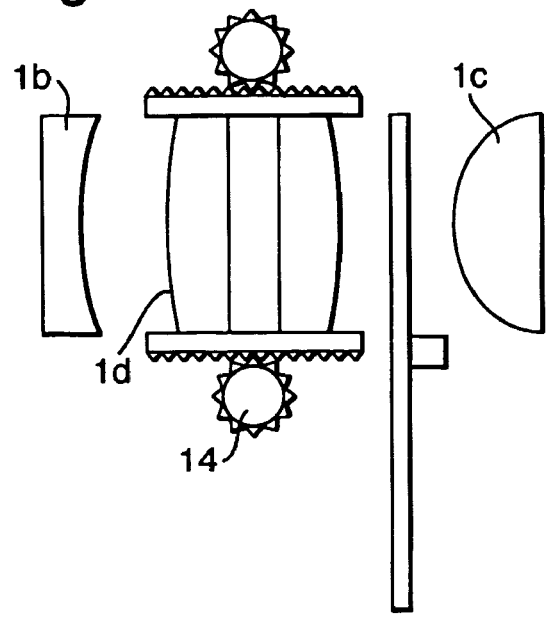
Figure 11:
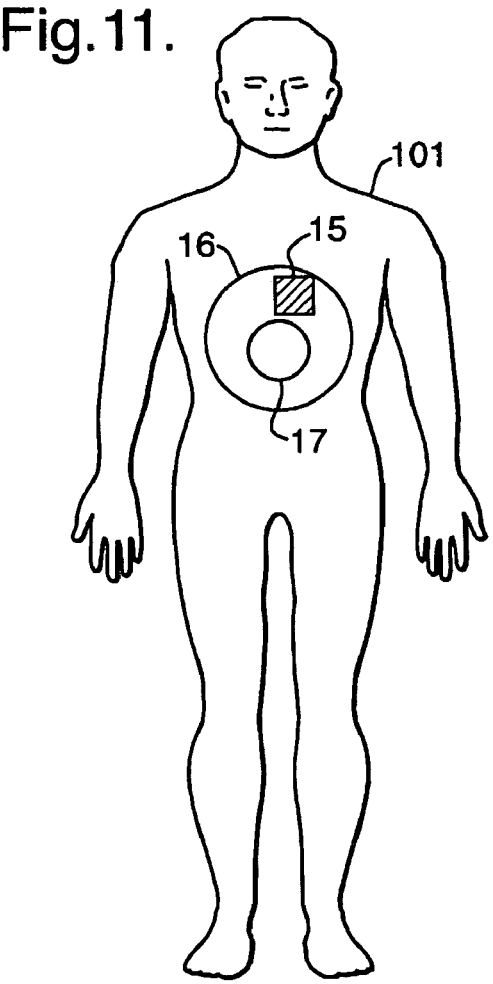
Figure 12:
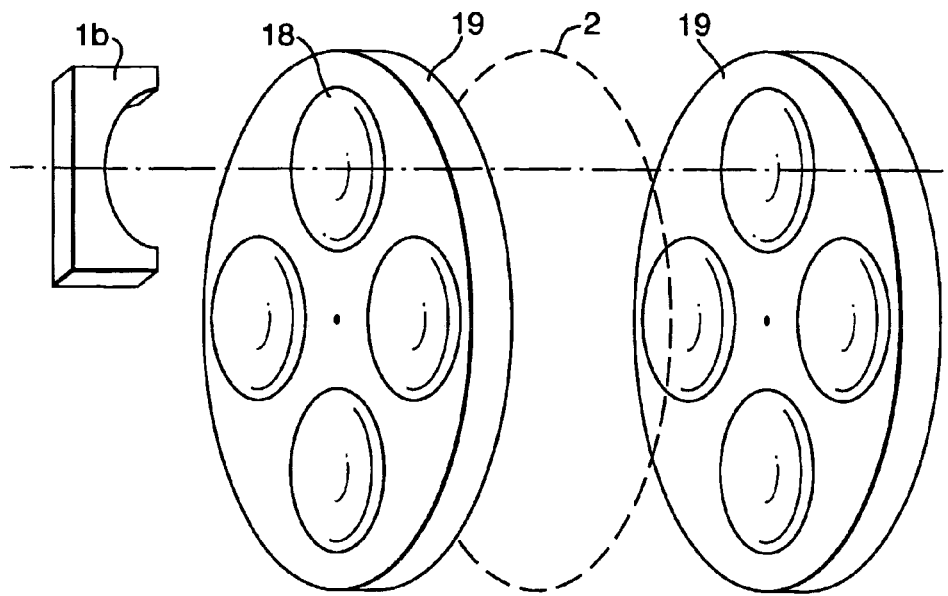
Figure 13:
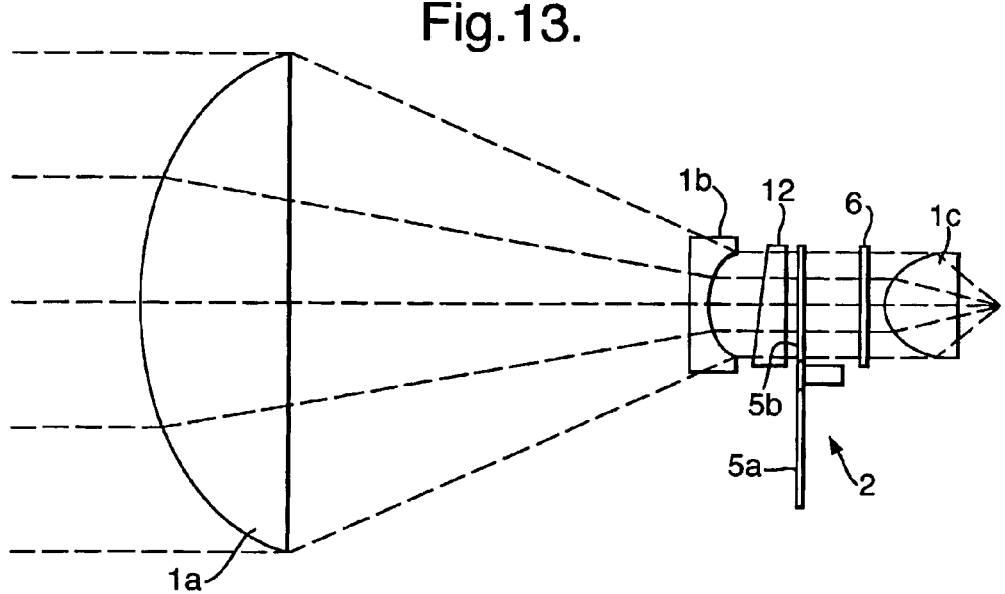
Figure 14:
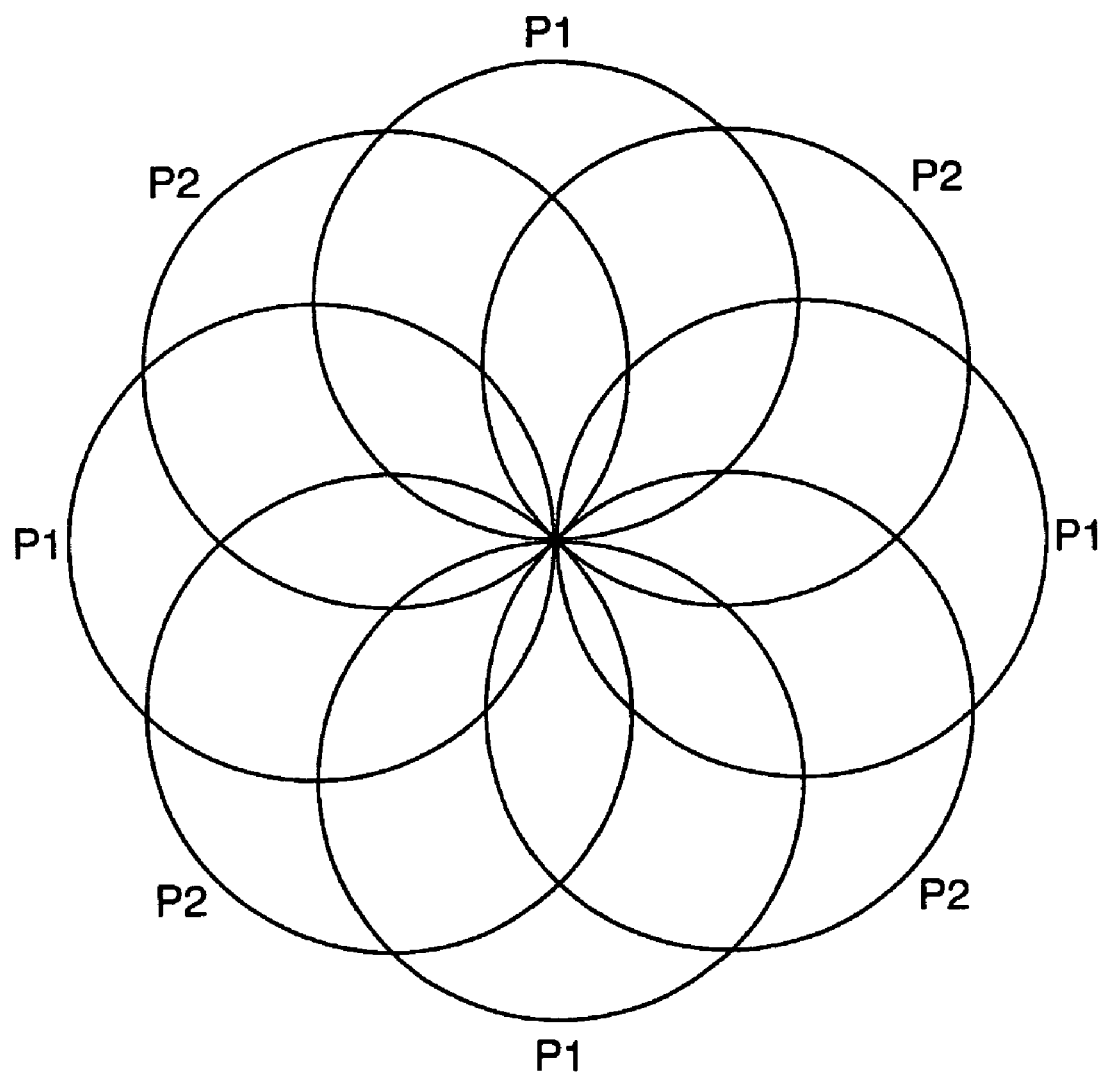
Figure 15A:
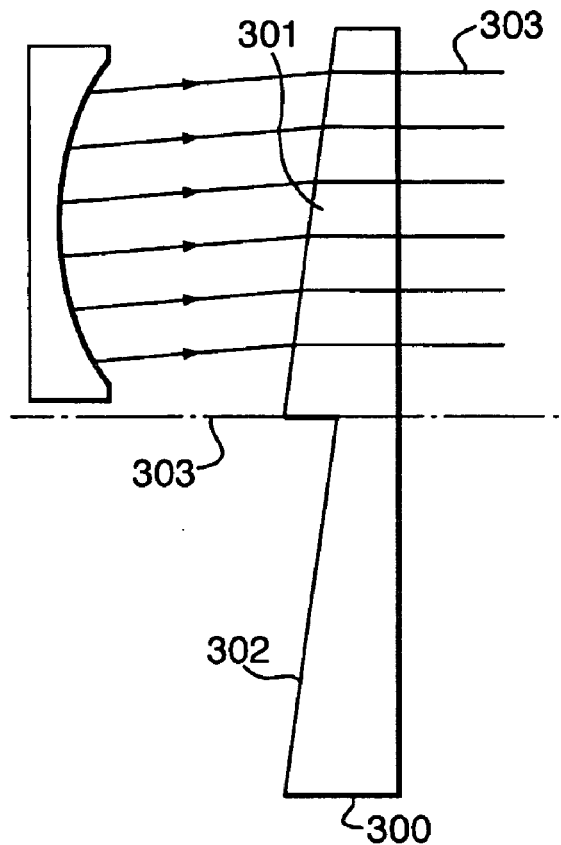
Figure 15B:
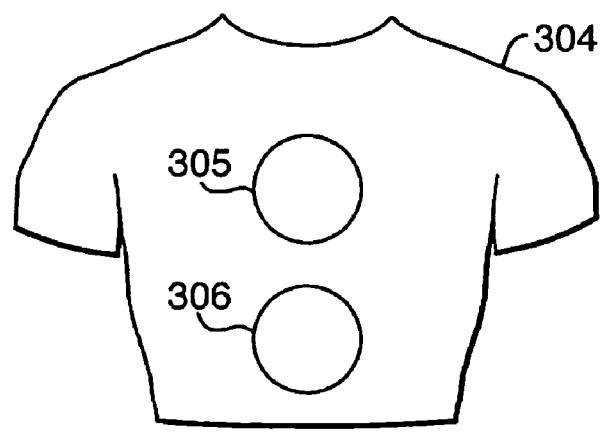
Figure 16:
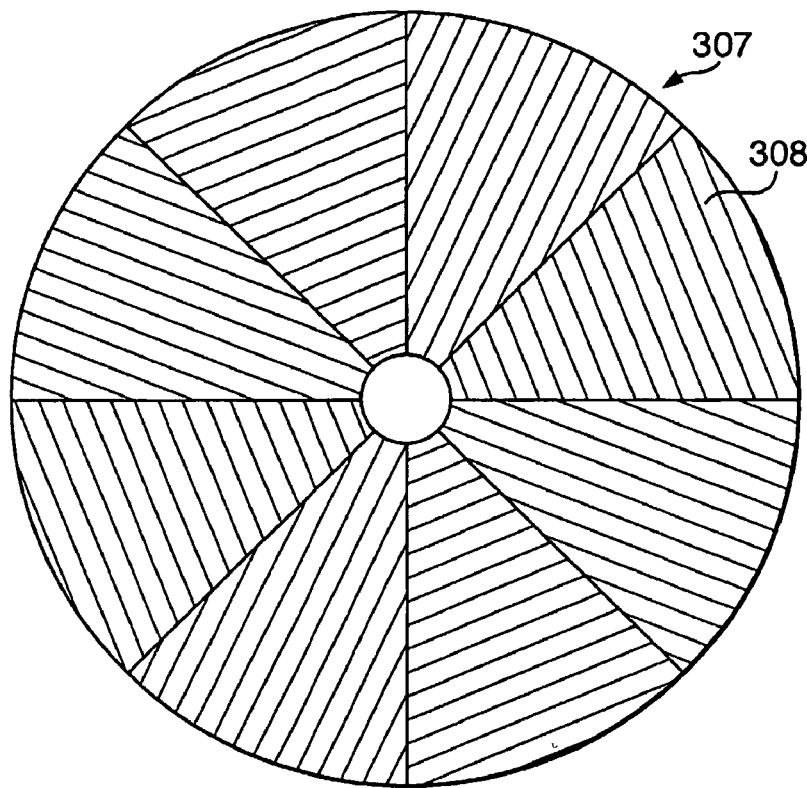
Figure 17:
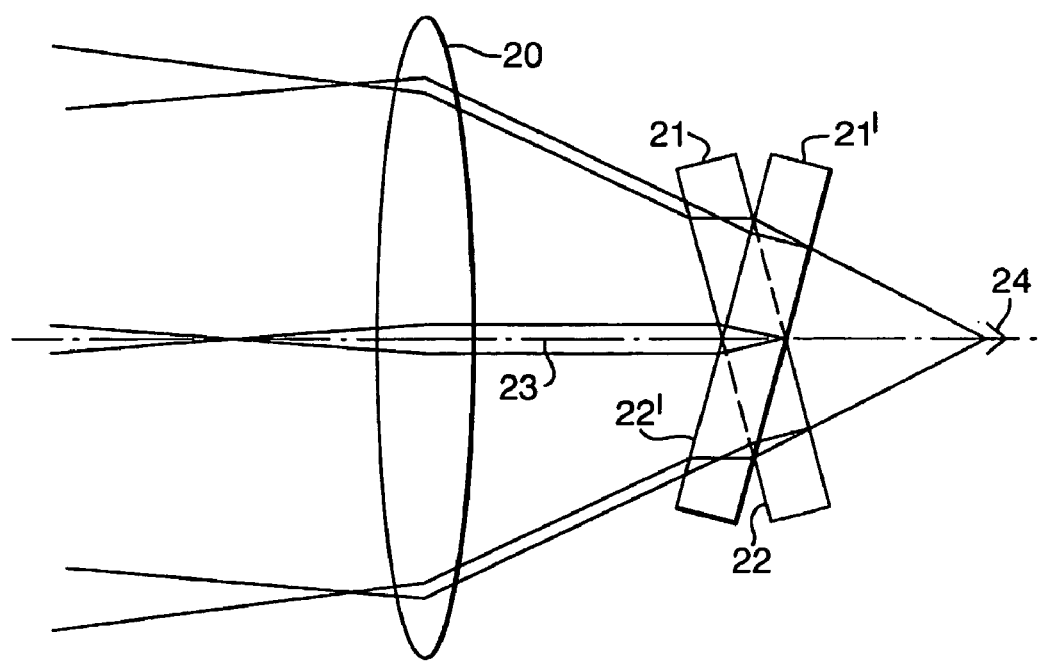
Figure 19:
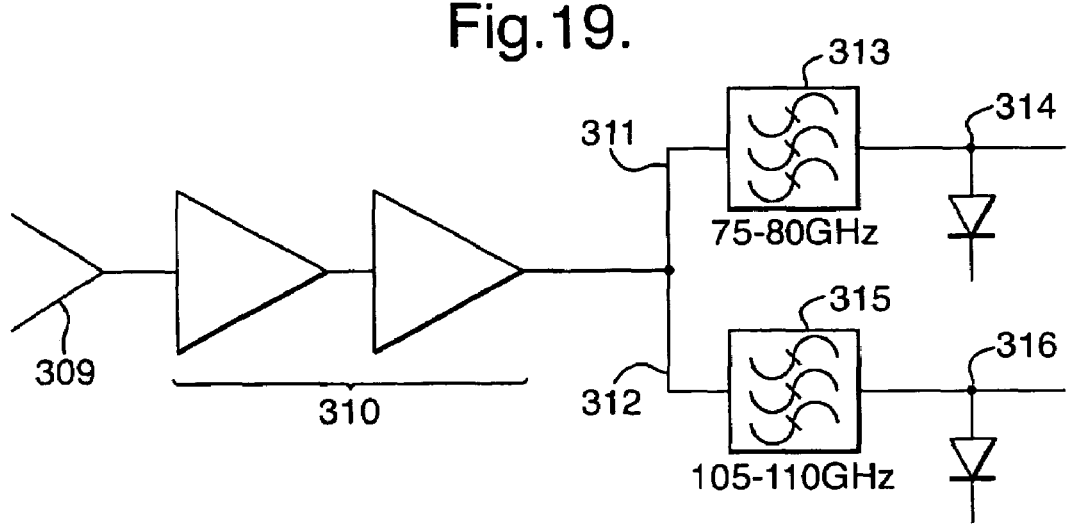
Figure 20:
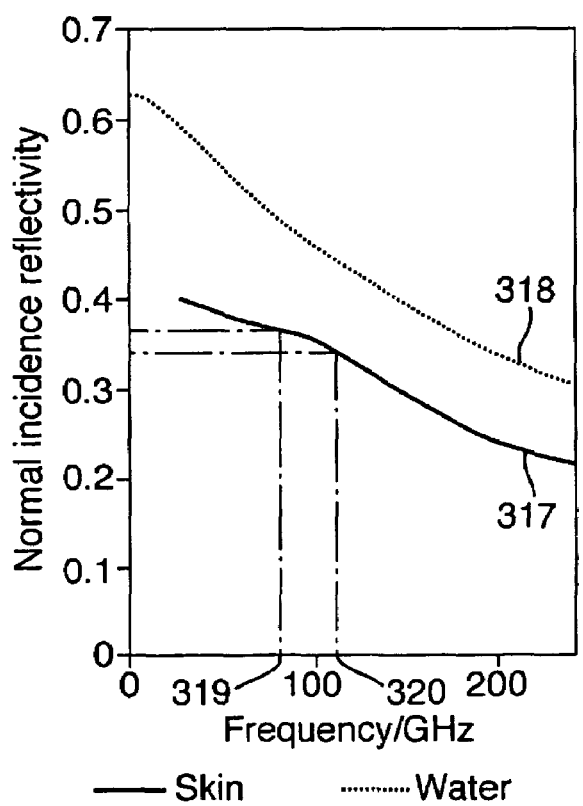

FIG. 10 diagrammatically illustrates a fourth embodiment that incorporates means for modulating the receive beam width;

FIG. 11 diagrammatically illustrates the effect of modulating the beamwidth upon a scene;

FIG. 12 diagrammatically illustrates another means for modulating the receive beamwidth of the device;

FIG. 13 diagrammatically illustrates a fifth embodiment, that incorporates the polarisation sensitive elements and the scanning elements present in some previous embodiments;

FIG. 14 diagrammatically illustrates the scan areas of the fifth embodiment;

FIG. 15 diagrammatically illustrates an alternative means of scanning the beam, along with a resulting scan pattern;

FIG. 16 diagrammatically illustrates an alternative arrangement for a polarisation sensitive element;

FIG. 17 diagrammatically illustrates an alternative embodiment that does not employ an afocal telescope;

FIG. 18 diagrammatically illustrates alternative methods for measuring radiation at different polarisations;

FIG. 19 diagrammatically illustrates an alternative receiver system for use with the present invention that allows improved discrimination of target materials; and FIG. 20 shows a graph of the reflectivity of skin and water with frequency.

A first embodiment of the current invention, as shown in FIG. 1, has a dielectric antenna 1 formed from three dielectric lens elements 1*a*, 1*b*, 1*c*. Elements 1*a* and 1*b* together form an afocal telescope, such that a collimated beam arriving at the input 1*a* is transformed to a still collimated beam at the output of element 1*b*, but of narrower diameter. The narrower beam passes through a calibration element 2 before being focused by lens element 1*c* onto a receiver element 3 which converts the electromagnetic signal into currents passing along electrical wires. The receiver element 3 comprises a receive horn 3*a* and amplification and/or downconversion electronics 3*b* plus a detector element such as a diode. Due to limitations of the components used, the current embodiment has a receive element 3 that is sensitive to only one orientation of polarisation, although this is not a requirement of the invention. At this stage the signal is amplified before being detected, and passed to circuitry able to provide an indication to the user based upon this detected signal.

The afocal telescope 1*a*, 1*b* allows the diameter of the collimated input beam to be set, depending on the focal lengths of the elements 1*a* and 1*b*, such that it is convenient for other system elements such the calibration element. The diameter of lens element 1*a* is approximately 150 mm, and it has a focal length of 168.7 mm, whereas element 1*b* has a diameter of approximately 40 mm and a focal length of 36.5 mm. Focusing element 1c has a diameter of 32 mm and a focal length of 24.7 mm. This arrangement provides a parallel beam of width of 32 mm, at the calibration element.

The lens elements 1a, 1b, 1c are made from high density polythene, which has a dielectric constant of approximately 1.50 at the design frequency of the equipment—this being approximately 80-100 GHz The calibration element of this embodiment comprises a rotatable disc 2 divided into four segments. This is best illustrated in FIG. 2 The disc 2 is arranged in relation to the input beam such that by rotating the disk 2 different segments are interposed in the beam's path. Two opposing segments are filled with a radiation absorbent material 4a, 4b which blocks the passage of radiation from the front end of the antenna, whilst the remaining two segments are clear, and freely allow the passage of radiation from the front of the antenna through to the receive element. The Radiation absorbent material (RAM) 4a, 4b acts as a "hot load" for calibration purposes; as it is at ambient temperature, it naturally emits a predictable level of radiation which is detectable by the receive element 3. This received value is used for calibration purposes within the detection circuitry.

The calibration disk is used to correct drift in the receive element. This drift typically occurs over a period the order of seconds or tens of seconds. Thus, a recalibration performed several times per second as with this embodiment is enough to counter the effects of this drift, or 1/f noise. The calibration effectively subtracts the measurement taken from the scene from the measurement taken from the hot load. Any sufficiently slow moving drift will have a negligible effect on this result. A motor 100 is arranged to rotate the disc 2 at a predetermined rate. The device knows when the hot load is interrupting the beam due to the presence of a sensor on the rotatable disk that indicates its position (not shown).

Note that some embodiments of the invention do not require a calibration disk. An alternative method that avoids the need for a calibration step that is suitable for certain embodiments is given below Due to the finite beamwidth at the point where the beam passes through the calibration device 2, the transition time of the hot load to switch in or out of the path of the beam is also finite. During this time, the detected energy is coming partially from the hot load, and partially from the scene. Energy received at the receive element 3 during this transition phase is thus disregarded.

The rotation speed of the calibration disc 2 is 25 revolutions per second, allowing for a maximum of 50 calibrations per second, and 50 energy measurements per second.

A second embodiment of the current invention is illustrated in FIG. 3. The embodiment allows measurements taken to be discriminated on the basis of the polarisation of the incoming radiation. Polarisation sensitive elements 5 have been mounted into the calibration disc, filling the space that was otherwise clear. A further polarisation sensitive element 6 has been positioned in the beam behind the calibration/polarisation disc 2. This element 6 is fixed in orientation, and doesn't move with the rotation of the disc 2. Shown at 50 is an indication of the position of the beam in relation to the disc.

FIG. 4 is a part sectional view of the disc 2, and shows the polarisation sensitive elements 5 in more detail. The elements 5 each comprise a polariser 7, behind which is mounted a quarter-wave plate 8. The polariser 7 is formed from a set of parallel conducting wires, appropriately spaced for the frequency range of interest. A typical arrangement would be for the wires to be copper tracks laid with a linewidth of 100 microns and at a pitch (i.e. period) of 341 microns on 250 micron thick TLX-9 substrate, as available from Taconic Advanced Dielectrics Division, 136 Coonbrook Road, Petersburgh, N.Y. 12158, USA. Element 5a is identical to 5b, except for the orientations of the polariser 7 and the quarter wave plate 8. The polarisers 7 associated with each element e.g. 5a have their directions of polarisation orthogonal to each other. Also, the fast axes of the quarter wave plates 8 of each of the elements 5 are oriented orthogonal to each other.

The quarter-wave plate used in this embodiment comprises a meanderline polarisation twister. FIG. 5 shows the detail of the meanderline structure, suitable for use at 80-100 GHz. Four substrates, each having a series of copper tracks arranged in a square-wave formation are sandwiched together, along with a blank spacer board that maintain the correct distance between central two active layers. The two outer active layers 9 (Grid type A) are 15 thousandths of an inch (thou) thick, whilst the inner two active layers 10 (Grid type B) are 10 thou thick. The central spacer board 11 is 3.5 thou thick. The material used for the substrates 9, 10 and spacer board 11 is TLX-9, again available from Taconic.

Fixed element 6 (shown in FIG. 4) in this embodiment is also a meanderline quarter-wave plate identical to 8 except in shape, oriented to convert the circularly polarised radiation from 5a and 5b back to linear polarisation parallel to the polarisation accepted by the receiver feed horn.

FIG. 6, along with Table 1 show the detail of the tracks that make up each of the panels of the meanderline, with the detailed dimensions of the various elements of the tracks in table 1, where w1 and w2 are linewidths, b is the periodicity, h is the height, and a is the pitch.

Necessary modifications to the design of the meanderline to account for different operating frequencies will be known to those skilled in the relevant arts, and will not be discussed further herein. Further details relating to meanderlines may be found in the following references: L. Young et al., *IEEE Transactions on Antennas and Propagation*, vol AP21, pp 376-378, May 1973, and R A Chu et al, *IEEE Transactions on Antennas and Propagation*, vol AP35, pp 652-661, June 1987. Details of some other devices that may be used in place of a meanderline for the optical component 11 are provided in *The International Journal of Infrared and Millimeter Waves*, Vol 2, No 3, 1981.

TABLE 1

| | Track dimension, microns | | | | |
|---|---|---|---|---|---|
| | A | B | H | w1 | w2 |
| Grid A | 294 | 1396 | 380 | 60 | 41 |
| Grid B | 436 | 1396 | 592 | 108 | 141 |

In use, the polarisation sensitive elements 5 rotate with the calibration disk, and hence cyclically form part of the path of the received beam of radiation from the scene. Care is taken to allow measurements of radiation from the scene to be taken only when the elements 5 are correctly positioned with respect to the receive beam. As the disc rotates, whilst the beam may be entirely within a particular element 5, the rotation will cause the orientation of the polarisation elements to change. Energy measurements taken across the whole of this region will thus be prone to error due to the orientation of the polarisation sensitive elements changing throughout the reading. For this reason, the reading taken is integrated across only 45° of rotation of the disc, when the beam occupies the central region of each element 5.

The effect of the rotatable elements 5 and the fixed element 6 is to convert horizontal polarisation (using one element e.g. 5a) and vertical polarisation (using the orthogonal element e.g. 5b) to the polarisation to which the receive element is sensitive. It does this as follows. Assume that radiation coming from the scene is plane polarised, on a horizontal axis. This radiation hitting the element having the vertical polariser will not pass through, and so will not be detected. Should the radiation instead hit the other element, it will pass through the polariser and be converted to circular polarisation by means of the quarter-wave plate 8b. This circularly polarised radiation will then pass through the fixed quarter-wave plate 6, which will convert the radiation back to linear polarisation, which is detected using the (suitably aligned) receive element.

Now assume that vertically polarised radiation is emanating from the scene. This radiation hitting the element having the horizontal polariser will be stopped, and hence not be detected. If the radiation hits the other element 5, it will pass through to the quarter-wave plate 8a where it will again be converted to circular polarisation. However, even though the polarisation entering the quarter-wave plate 8 is orthogonal to the case described in the above paragraph, the output of quarter-wave plate 8a will be circular radiation having the same handedness as described in the paragraph above, because the fast axes of the two rotatable quarter-wave plates 8a and 8b are orthogonal. Hence, when this radiation is passed through the fixed quarter-wave plate 6 it is again converted to radiation having the orientation at which the receive element is sensitive.

In this way, a complete rotation of the disk 2 allows two readings to be taken from a scene, with each taken at differing polarisations. The readings taken at each polarisation can be compared, and an indication provided to the user based on these readings. Alternatively, two readings can be provided, one at each polarisation, or the two readings can be combined to produce a composite reading of both polarisations.

A third embodiment, best illustrated in FIG. 7, allows the receive beam direction to be modulated without physically moving the device. This facility allows readings to be taken from multiple areas of a scene quickly and accurately, without the user needing to point the device to those areas manually, and allows simple comparison of the measurements taken at these areas. The modulation in this embodiment is carried out by means of a rotatable prism 12 mounted in front of the calibration element 2. As the prism 12 rotates it deflects the receive beam direction through an angle dependent on the shape of the prism. The present invention incorporates a prism 12 that has a face cut at approximately 7.3° to the plane normal to its rotational axis. This has the effect of dithering the beam at the prism 12 by approximately 7.3° in total, which translates to a movement of the beam the other side of the afocal telescope 1a, 1b of approximately 1.5° in total. This is similar to the half-power beamwidth of the receive beam, and so measurements will be taken from adjacent areas on the scene as the prism 12 scans In this embodiment the calibration element 2 may be optionally discarded. The system can be arranged to remove the effects of drift in the receiver by taking as its output a difference between readings recorded at different parts of the scene. However, a disk is still employed in a similar position and is used to hold the quarter-wave plates. If the calibration elements are kept however, there is provided the facility to differentiate between a target which is "cooler" than its background, and a target that is "hotter" than its background, as the calibration disk will be at a known radiometric temperature. It will be understood by one normally skilled in the art that the words "cooler" and "hotter" refer to the radiometric temperature of the subject, rather than the thermal temperature.

The prism 12 is formed from high density polythene, and is rotatably mounted in path of the beam by means of bearings positioned around the circumference of the prism 12. The prism 12 is arranged to rotate at a rate one quarter that of the calibration element 2. This allows eight measurements to be taken per revolution of the prism, and hence the scan pattern 13 on the scene 101 will be as shown in FIG. 8.

Alternatively, the calibration disk 2 may be arranged to rotate at a rate of (r+0.5) times the rate of the prism 12, where r is an integer. This will mean that an odd number of (possibly overlapping) areas on the target are measured, and provides the benefit that during two full revolutions of the prism 12, each of the measured areas on the target are measured at both polarisations. This improves the accuracy of measurements of parts of a scene taken at differing polarisations, as in this case the areas measured during two revolutions of the prism will be exactly aligned (assuming other factors do not change). Thus the use of polarisation as a discriminant in deciding whether an object of interest is present is aided by using the non-integer rotation ratio. It will be clear to a person skilled in the art that other non integer ratios will also be beneficial in this regard. It will also be clear to a person skilled in the art that using an integer relationship will allow polarisation to be used as a discriminant, if successive measurements of a particular area overlap, but reduced performance may result due to successive measurements of a particular area not being perfectly aligned FIG. 9 shows the effect of this alteration of rotation rate on the measurements taken from a scene. The seven upper circles represent the calibration disk 2 at seven different times in the measurement procedure. The calibration disk 2 is shown divided into quadrants, with two opposing quadrants 203, 204 having lines representing polarisation sensitive elements arranged to pass either horizontal or vertical polarisation respectively. The small circle 205 represents the received radiation passing through the calibration disk, and indicates the active polarity at time $t_n$. At each time $t_n$ the disk is shown rotated through half a revolution compared to $t_{n-1}$, so that alternative polarisations are passed, and hence measured, at successive time intervals.

Below each of the seven representations of the calibration disk 2 are two further circles 200 which represent a scene being measured. The unshaded smaller circle 201 within each circle 200 represents the point on the scene 200 from which the measurement is being made at that particular time $t_n$. The middle row of circles 200 represent the measurements taken when the prism 12 is rotating at the same rate as the prism, i.e. r=1. This value of r has been chosen to illustrate the principle, and may not be one used in practice. It will be seen that when a particular area 201 (e.g. the lower area 201 at times t=0, 2, 4, 6) is being measured on the scene 200, the measurement is always made at the same polarity.

Contrast this with the situation when r=1.5, which is represented by the lower set of seven circles 200. Successive measurements of a given area 201 (again, say the lower one at times t=0, 3, 6) are now taken at alternate polarisations. The measurement of the same spot at alternate polarisations allows better discrimination methods to be used in identifying characteristics of any object present at that spot, as described elsewhere in this specification.

A fourth embodiment of the current invention provides another means for modulating the beam, such that readings from different areas may be taken from the scene and compared to produce an output. This embodiment is shown in FIG. 10. Here, instead of changing the direction of the beam using a rotating prism as with the previous embodiment, the beamwidth is altered by means of changing the power of the lens 1 (shown in FIG. 1). The lens power is changed by incorporating a moveable lens element 1$d$ that has the effect of changing the focal length of the lens 1—effectively creating a zoom lens. The lens element 1$d$ may be moved linearly along the axis of the lens 1 by means of motors 14 or other means. Although not shown in FIG. 10, there may be multiple lens elements 1$d$ that are able to move at different speeds or directions so as to improve the performance of the zoom lens.

The beam coverage on a scene a given distance from the lens 1 will therefore change in size as the focal length of the lens is changed, creating a larger or smaller coverage "spot" on the scene. This is shown in FIG. 11. If a small but highly reflective object 15 is present in a scene 101 at which the beam is pointed when adjusted to produce a larger spot size 16, the received signal will be reasonably strong. If, when the lens is adjusted to produce a smaller spot size 17 the return signal drops, it will be clear that there is an object in the region of the larger spot 18, but not in the region of the smaller spot 17, and that the object 15 and its surroundings 101 have different reflection properties. This object 15 can then be further investigated using other methods.

An alternative configuration for implementing the varifocal lens in this embodiment is shown in FIG. 12. Here, instead of moving one or more elements of the compound lens 1 axially so as to change the overall focal length of the lens 1, different lens elements e.g. 18, each having different strengths are inserted into the compound lens arrangement 1. This has a similar effect, but is easier to implement, as the lenses e.g. 18 are, in this embodiment, mounted upon rotatable disks 19. Each disk 19 holds four lenses 18 of differing powers, and when a measurement is being taken only one lens 18 from each disk 19 is in the path of the received radiation. Changing focal length of the compound lens 1 is done by rotating the disks 19 until the correct lenses 18 are positioned in the radiation path. The embodiment has two disks 19 each incorporating four individual lens elements 18. The discs 19 are preferably mounted either side of the calibration element 2, and behind the rear afocal lens element 1$b$ (shown in section view).

In use, one or more measurements will be taken with lenses 18 chosen so as to provide a known beamwidth. Following this, the discs 19 will be rotated to select another pair of lenses that changes the beamwidth to another known setting. One or more readings will be taken with this new setting, and measurements taken at differing beamwidth settings compared.

The details regarding incorporation of lens elements into an existing compound lens arrangement so as form a zoom lens is known in the art, and so further details will not be provided herein. For more information on the design of zoom lenses see W. J. Smith, 'Modern lens design—a resource manual', Ch. 16.3 pp 292-299, McGraw-Hill 1992

A fifth embodiment is shown in FIG. 13. This embodiment incorporates the polarisation sensitive elements 5, 6 discussed in the second embodiment, along with the beam scanning elements 12 discussed in the third embodiment. The prism is arranged to rotate at a quarter of the rate of the calibration element. Thus, one revolution of the prism will result in eight measurements being taken, each at alternate polarisations.

The embodiment of FIG. 13 can be employed to give a greater degree of discrimination towards metallic objects in a scene. To do this, readings from two or more areas of the scene are taken at orthogonal polarisations. If the readings taken at the same polarisation from different parts of the scene produce differing power returns, this is indicative of the presence of an object on the target. Next, the readings at orthogonal polarisations are examined. If these readings are similar to each other, this will indicate that the object is likely to be metallic in nature, due to the reflectance properties of metals at non-glancing angles. In a similar fashion, the system can be arranged to be more sensitive to non-metallic objects by looking for a suitably large difference in the readings taken at orthogonal polarisations. Such indications are used to trigger an alert to an operator indicating that further investigation may be required.

The scan pattern of the fifth embodiment is shown in FIG. 14. The area within each circle represents most of the energy that is received in an individual measurement, and also the approximate shape of the half power beam upon a scene. Here, it can be seen that alternate scans are taken at alternate polarisations, due to the action of the rotating polarising elements. The circular half power beam shape shown is only approximate because in practice the rotation of the system elements during each measurement will result in the individual scan areas being slightly ellipsoid in shape, although this has no disadvantage in practice.

FIG. 15$a$ shows an alternative means for scanning the beam, this time between two discrete positions as opposed to the effectively conical scanning arrangement discussed in relation to the third embodiment. Scanning prism 300 replaces the rotating prism 12 shown in FIG. 7. This prism 300 comprises two segments 301, 302, and in use rotates about axis 303 such that each segment 301, 302 is in the path of the incoming radiation for approximately 50% of the time. The segments 301, 302 are shaped such that for the duration of a segment being fully in the radiation path, it directs the incoming radiation 303 from a fixed angular region in space to the receive element (not shown). Each segment is arranged to direct radiation from a different region. Each segment 301, 302 is shaped like a portion of the side of a cone having an axis 303, but the segments 301, 302 are inverses of each other to enable radiation from differing regions to be focused onto the receive element.

FIG. 15$b$ shows the resulting scan pattern on a scene comprising a body 304. Two regions 305, 306 are shown from where the radiation received will be focused onto the receive element, each corresponding to a different segment 301, 302 of the scanning prism 300. The scanning arrangement shown is more efficient than previous embodiments as radiation from the fixed region is viewed for more of the angular rotation time as compared with previous embodiments. More energy can be received in this greater time, leading to improved system signal to noise ratios.

FIG. 16 shows an alternative arrangement for the disk 2 as shown in FIG. 3. As the operation of the polarisation sensitive elements 5 of FIG. 3 is dependent upon their angular position in relation to the fixed polarisation element 6, there is only a relatively short angular window in which valid measurements can be made, leading to reduced signal integration times and hence reduced system signal to noise ratios. The embodiment of FIG. 16 increases this angular window, by incorporating disk 307 having a revised arrangement of polarisation sensitive elements e.g 308. The alternative disk 307, as shown in FIG. 16 has a greater number of segments e.g. 308 occupying the same angular space as the previous disk 2. Each of the segments e.g. 308 therefore covers a smaller angular range, and so a greater portion of each segment can be arranged to be within the angular window in which valid measurements can be made, as opposed to having a larger segment where only the central portion is within that angular window as discussed in relation to FIGS. 4, 5 and 6.

The disk 307 has alternate quarter-wave plate segments e.g. 308 arranged, in combination with fixed element 6 (shown in FIG. 3) to convert horizontal and vertical polarisations respectively to the state to which the receive element 3 (shown in FIG. 1) is sensitive.

To reduce the required disk diameter, the disk 307 may be mounted between lens 1c and receive element 3 (as shown in FIG. 1), where the beamwidth is smaller, allowing the area of the polarisation sensitive elements to be reduced.

When employed together, the revised scanning means discussed in relation to FIG. 15 and the revised arrangement of polarisation sensitive elements discussed in relation to FIG. 16 improve the energy collection efficiency of the system from 2% for the embodiment shown in FIG. 7 up to approximately 20%.

In a further embodiment both the prism 300 in FIG. 15a and the polarisation sensitive elements disc 307 in FIG. 16 are mounted on the same shaft and thus rotate at the same speed, reducing mechanical complexity. A scan efficiency of approximately 20% is achievable. In another implementation the polarisation sensitive elements disc may have an odd number of sectors (with one extra sector of a particular polarisation received compared to the other polarisation) and the prism performs a half-turn every time the polarisation sensitive elements disc moves the beam from the centre of one sector to the centre of the adjacent sector. In this implementation a scan efficiency of approximately 30% is achievable but at the cost of mechanical complexity—the prism and disc have separate shafts and drives, and the prism has to spin very rapidly leading to potential problems with balancing, aerodynamic drag and power requirements.

FIG. 17 shows an alternative embodiment that does not employ an afocal telescope and which is able to scan a beam. This may make the optical arrangement more compact, leading to a smaller detector device. Lens 20 is made from polythene, and is mounted in front of parallel faced slab 21. The slab 21 is mounted such that it can rotate about an axis 23, being driven by a motor (not shown). A normal to one of the parallel faces 22 is arranged at an angle to the axis 22. For instance, if the front lens 1a of the afocal telescope used in the previous embodiments is used on its own, a parallel sided slab of high density polythene 16.9 mm thick rotating about the optical axis of the system and tilted at 20 degrees to the optical axis of the system would perform the equivalent scanning function to the prism in the previous embodiments. This slab would be of a size so that it is just contained in a cylinder of diameter 28.2 mm centred on the optical axis, and the rear surface of the slab at the intersection with the optical axis would be 12.9 mm in front of the focal plane. A receive element 24 is mounted at the focal point of the system, as in previous embodiments. The lens 20 is arranged to direct radiation from a scene onto a parallel face 22 of the slab 21. The position of slab 21 at any given instant will govern where in the scene the radiation comes from that is finally focused onto the receive element 24, due to refraction effects within the slab 21. Radiation coming from an upper part of the scene passing through the lens 20 will be directed towards the lower half of the region between the lens 20 and the slab 21. When the slab in is position 21 it will tend to direct radiation from this lower half onto the receive element 24. Conversely, radiation coming from a lower part of the scene will be directed more in to the upper half of the region between lens 20 and the slab 21. This will tend to be focused onto the receive element 24 when the slab 21 has moved into the position 21'. Thus, by rotating the slab 21 the receive beam is directed in a conical scan.

The polarisation dependent elements described in other embodiments may be included in the embodiment shown in FIG. 17. However the normally skilled person will realise that in this embodiment the beam is always converging, and so the size of any polarisation dependent elements will need to be determined appropriately according to their position within the system.

Figure 18A:
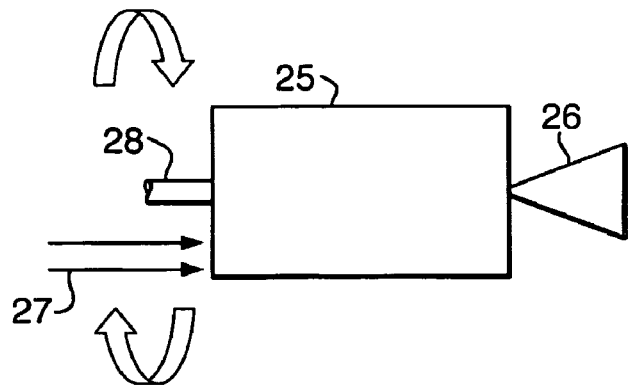

FIG. 18 shows two alternative methods for measuring a scene at differing polarisations. These both rely on the polarisation dependence of the receive element. FIG. 18a shows one-approach where the receiver module 25, including the feedhorn 26 and receive element (not shown) are all rotated through 90° between measurements, about the shaft 28 using a motor (not shown), thus allowing the two orthogonal polarisations to be measured. Slip rings may be used for the transfer of power and signal lines 27 to the receiver module 25.

Figure 18B:
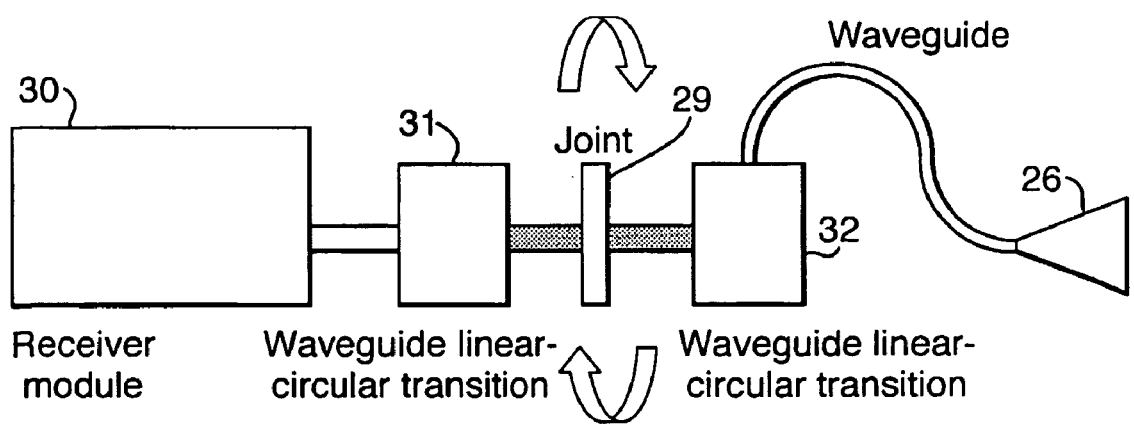

FIG. 18b shows an alternative technique wherein the feed horn 26 is arranged rotate on its own, being connected to the receiver module 30 by a waveguide rotary joint 29. This would give more repeatable results compared to the embodiment of FIG. 18a since there would be no requirement for slip rings, however a waveguide rotary joint 29, a well-known component to any person skilled in the art (e.g. G. C. Southworth, 'Principles and applications of waveguide transmission', pp 364-366, D. Van Nostrand Company Inc, 1950), comprises two linear-to-circular waveguide converters 31, 32 as well as the joint 29 itself, so is heavy and of limited bandwidth—which would reduce the sensitivity of the device.

FIG. 19 shows a means for improving the discrimination of materials upon a body, and hence may more reliably indicate the presence of a suspicious object. The Figure shows a revised receiving means (broadly equivalent to that of item 3 of FIG. 1) comprising a receive horn 309, which supplies received energy to amplification electronics 310. The output of the amplifier 310 is split into two paths 311, 312. Path 311 goes via band pass filter 313 and then on to detector means 314. Path 312 goes via band pass filter 315 and then on to detector means 316. Filter 313 is arranged to pass most strongly those signals having a frequency at the lower end of the amplifier or waveguide bandwidth for example between 75 GHz and 80 GHz, whereas filter 315 is arranged to pass most strongly those signals having a frequency at the higher end of the amplifier or waveguide bandwidth for example between 105 GHz and 110 GHz. This allows received energy at each passband to be separately detected, and hence compared.

As shown in FIG. 20, the reflection from skin at normal incidence is different at each frequency band. The solid trace 317, representing the reflectance of skin is seen to largely mirror the reflectance of water, indicated by the dashed trace 318. This is not surprising, as skin is made up largely from water. In the lower frequency band, indicated by line 319, the reflectivity is seen to be approximately 0.375, whereas this drops to approximately 0.34 for the higher band, indicated by line 320.

Incorporating the receiving means of FIG. 19 therefore allows a measurement taken at a given instant to be examined to see whether this difference in received power at each frequency band is present in the measurement. If it is not, then this is an indication that the measurement does not come from skin, and so is more likely to be either metallic or some other substance. This information may be fed in to any decision as to whether to trigger an alert to an operator, and may be used to reduce false alarm rates.

The skilled person will be aware that other embodiments within the scope of the invention may be envisaged, and thus the invention should not be limited to the embodiments as herein described. In particular, features such as the polarisation dependent elements, and different scanning means disclosed herein may clearly be interchangeable between embodiments and their appearance on a given embodiment does not mean that they cannot be utilised on other embodiments.

The invention claimed is:

1. A detection device for discriminating between different materials comprising an optical system having at least one antenna element and a receive element characterised in that the receive element is sensitive to millimetre-wave radiation, the optical system is arranged to focus incident energy from a scene onto the receive element, and the device is adapted to measure the power of a received signal at different times and further adapted to include a beam steerer for redirecting an incoming direction of the incident energy to be able to make measurements from different parts of the scene, and provide an indication based on the measurements without using said measurements in the formation of an image of the scene.

2. A detection device as claimed in claim 1 wherein the device is adapted to measure radiation at a plurality of polarisations from the scene.

3. A detection device as claimed in claim 2 wherein means for altering the polarisation of the radiation within the device is incorporated in the optical system.

4. A detection device as claimed in claim 3 wherein the receive element is sensitive to a first polarisation state, and the means for altering the polarisation periodically alters the polarisation of radiation orthogonal to the first polarisation state such that it is in the first polarisation state.

5. A detection device as claimed in claim 4 wherein the polarity changing means incorporates a fixed quarter-wave plate and at least one moveable quarter-wave plate arranged such that the position of the (at least one) moveable quarter-wave plate determines which polarisation of the radiation incident upon the optical system will be detectable by the receive element.

6. A detection device as claimed in claim 5 wherein the quarter-wave plates are fitted with polarising elements.

7. A detection device as claimed in claim 5 wherein the at least one moveable quarter-wave plate is rotatably mounted such that radiation incident upon the optical system may be directed through the at least one moveable quarter-wave plate, and at different angular positions the radiation passing through the at least one quarter wave plate sees orthogonal fast axes.

8. A detection device as claimed in claim 5 wherein the quarter-wave plates comprise meanderline structures.

9. A detection device as claimed in claim 1 wherein the device includes an internal millimetre-wave source arranged to periodically provide a reference signal to the receive element, the reference signal being used in calibration of the device.

10. A detection device as claimed in claim 9 wherein the internal millimetre-wave source comprises a radiation absorbent material rotatably mounted such that it periodically interrupts the path of the radiation received by the optical system.

11. A detection device as claimed in claims 1 wherein the device is arranged to change the direction of arrival of the incoming radiation with time.

12. A detection device as claimed in claim 11 wherein the device is arranged to make successive measurements at orthogonal polarisations.

13. A detection device as claimed in claim 12 wherein the device is arranged to measure successive measurements in a particular direction at orthogonal polarisations.

14. A detection device as claimed in claim 11 wherein a refractive element is mounted in the path of the received radiation, the refractive element being rotatable such that different rotational positions result in energy from differing directions being passed to the receive element.

15. A detection device as claimed in claim 14 wherein the refractive element comprises a prism.

16. A detection device as claimed in claim 14 wherein the refractive element comprises at least one segment of a cone.

17. A detection device as claimed in claim 14 wherein the refractive element comprises a parallel faced slab rotatably mounted such that a normal to a parallel face does not lie on the axis of the antenna.

18. A detection device as claimed in claim 1 wherein the device is arranged to change the beamwidth of a receive beam with time.

19. A detection device as claimed in claim 18 wherein the beamwidth is arranged to be changed by means of changing the focal length of one or more lens elements making up the optical system.

20. A detection device as claimed in claim 19 wherein the means for changing the focal length of one or more of the lens elements comprises apparatus for switching different lenses into the path of the received radiation.

21. A detection device as claimed in claim 1 wherein the optical system comprises an afocal telescope.

22. A method of detecting objects present in a scene by means of receiving millimetre wave radiation from the scene using a scanning optical system, wherein:
 a first measurement is made of radiation from a first scanned part of the scene;
 a further measurement is made of radiation from a second scanned part of the scene wherein the second part of the scene may overlap with the first part of the scene; and
 an indication is provided if characteristics of the first measurement are different to characteristics of the further measurement without using said measurements to form an image of the scene.

23. A method as claimed in claim 22 wherein an observed characteristic is the received power level.

24. A method as claimed in claim 23 wherein power levels at orthogonal polarisations are used as an observed characteristic.

25. A method as claimed in claim 22 wherein the incoming radiation is focused onto a receive element by means of an optical system.

26. A method as claimed in claim 25 wherein the optical system incorporates scanning means to change with time the direction of arrival of the incoming radiation such that measurements from different parts of the scene are taken.

27. A method as claimed in claim 25 wherein the receive element is sensitive to the polarisation of the incoming radiation, and means is incorporated for altering the polarisation of incoming radiation.

28. A detection device for discriminating between different materials comprising an optical system having at least one antenna element and a receive element characterized in that the receive element is sensitive to millimeter-wave radiation, the optical system is arranged to focus incident energy from a scene onto the receive element, and the device is adapted to measure the power of a received signal at different times and further adapted to include optics for changing the beamwidth of the antenna to allow measurements from different sized parts of the scene, and provide an indication based on the measurements, without using said measurements in the formation of an image of the scene.

* * * * *